United States Patent [19]

Enright et al.

[11] Patent Number: 4,872,908
[45] Date of Patent: Oct. 10, 1989

[54] METAL TREATMENT

[75] Inventors: Philip G. Enright, Hook Norton; Andrew J. Hobbis; Ronald E. Tapping, both of Banbury, all of England

[73] Assignee: Alcan International Limited, Quebec, Canada

[21] Appl. No.: 140,268

[22] Filed: Dec. 31, 1987

[30] Foreign Application Priority Data

Dec. 31, 1986 [GB] United Kingdom ................ 8631085

[51] Int. Cl.$^4$ .................... C22B 21/00; C22C 24/00
[52] U.S. Cl. ...................................... 75/68 R; 75/63; 75/66; 420/400
[58] Field of Search ..................... 75/63, 66, 68 R; 420/400

[56] References Cited

U.S. PATENT DOCUMENTS 3,737,303  6/1973  Blayden .............................. 75/68 R
3,948,650  4/1976  Flemings ........................... 75/65 R Primary Examiner—Peter D. Rosenberg
Attorney, Agent, or Firm—Browdy and Neimark

[57] ABSTRACT

A method of forming a filter cake for filtering liquid metal from particles stable within the liquid metal on an inert, liquid metal permeable substrate in the flow path of the liquid metal to be filtered characterized by depositing the particles in the flow path upstream of the substrate to be carried at least partially by the metal flow and dispersed as a pre-wetted and pre-primed filter cake on the substrate.

29 Claims, 5 Drawing Sheets

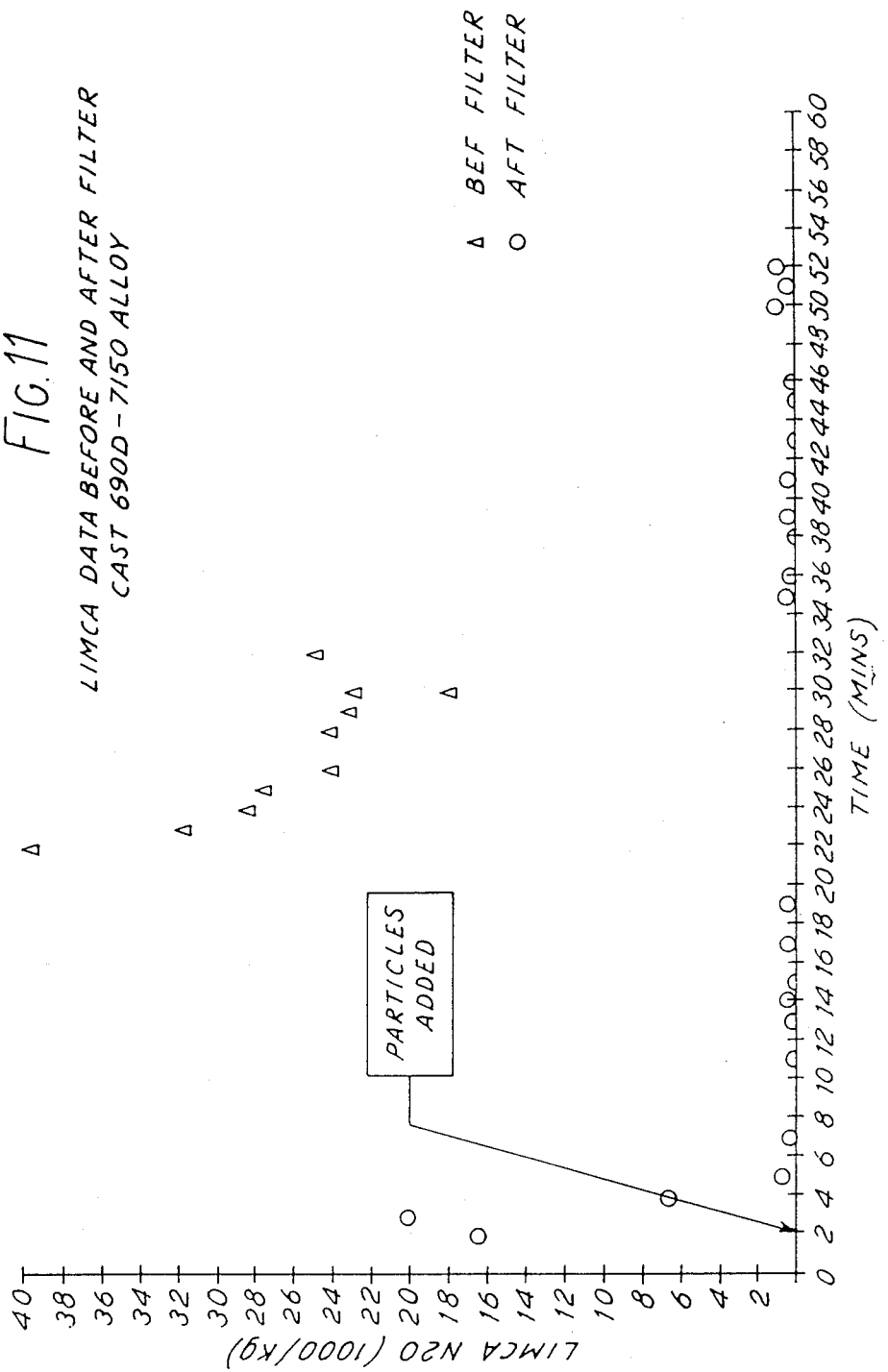

METAL TREATMENT

FIELD OF THE INVENTION

This invention relates to a method of forming a filter for a liquid metal; a liquid metal filter; a method of filtering liquid metal; a metal matrix composite useful in enhancing such filtration; a process for producing such a composite and filter cartridges containing cast products of the composite.

DESCRIPTION OF THE PRIOR ART

Liquid metals generally contain a variety of inclusions that are detrimental to the product of a subsequent casting process. In the case of light metals, such as liquid aluminium and its alloys, the inclusions may include oxide films, spinels and borides. It is therefore customary to filter the metal before casting in order to improve the quality of the cast product.

A conventional method of filtering liquid aluminium is to pass the metal through a porous ceramic block. This may be a ceramic foam filter or a rigid media filter in the form of a sintered block of silicon carbide or alumina chips.

In some circumstances, because of the inherent highly porous structure ceramic foam filters may have a low and unreliable filtration efficiency, for example, when filtering relatively clean metal. Rigid media filters are of inherently higher efficiency but can become blocked very rapidly by trapped inclusions from the liquid metal; indeed in some circumstances a rigid media filter can become completely blocked during the production of a single casting which can prevent its use for such application. Also some rigid media filters may be difficult to prime.

In this specification where we refer to "priming" a filter we mean the complete wetting of the internal surfaces of the filter at the start of metal flow therethrough. Without such complete wetting there can be problems with starting the metal flow; incomplete use of the available filter surface area and volume; premature build-up of metallostatic head behind the filter and reduced metallurgical efficiency and reliability in terms of inclusion trapping and release.

SUMMARY OF THE INVENTION

According to one aspect of the present invention there is provided a method of forming a filter cake, for filtering liquid metal, from particles stable with respect to the liquid metal on an inert, liquid metal permeable substrate in the flow path of the liquid metal to be filtered characterised by depositing the particles in the flow path upstream of the substrate to be carried at least partially by the metal flow and dispersed as a pre-wetted and pre-primed filter cake on the substrate.

The present invention also provides a liquid metal filter formed according to the preceding paragraph and to a method of filtering liquid metal using such a filter.

Some embodiments of the present invention make use of a metal matrix composite formed from a metal alloy which may be different from but miscible with the alloy to be filtered and which contains the stable particles already wetted by the alloy of the metal matrix composite.

According therefore to another aspect of the present invention there is provided a process for producing a metal matrix composite from a light metal alloy containing particles stable with respect to the alloy in its liquid state comprising the steps of:

1. holding a body of the liquid metal alloy in a furnace.
2. stirring only a first region of the alloy so that a second region thereof remains substantially undisturbed and
3. adding the particles to the first region so that as the stirring operation continues the particles move through the first region to form a slurry of the metal matrix composite in the second region.

The metal matrix composite produced according to the preceding paragraph may be used as a slurry or as a cast product in the formation of a filter cake on a substrate as described and claimed herein.

The present invention also provides a filter cartridge comprising a liquid metal permeable casing containing cast products of the metal matrix composite so that when the cartridge is disposed in the flow path of a liquid metal to be filtered the cast products rapidly melt to deposit their contained particles as a filter cake on a substrate. In this case the substrate may be external of the cartridge or it may be formed at a lower region of the cartridge.

In this specification the term "substrate" is to be understood as including anything that will stably support the filter cake and is liquid metal permeable. When used for filtering liquid aluminium and its alloys, the substrate may for example be a ceramic block; a ceramic foam filter; a rigid media filter; a loose bed of granules; a perforated ceramic plate or grid or a woven glass cloth.

DESCRIPTION OF THE DRAWINGS

Various aspects of the present invention will now be described by way of example with reference to the accompanying drawings in which:

FIGS. 9 and 10 are views similar to FIGS. 7 and 8 with a further arrangement and FIG. 11 is a graph.

Referring to FIG. 1 the filter unit has a generally horizontally extending launder 1 which carries liquid aluminium or an aluminium alloy 2 in the direction of the arrows A1 to A3. The base 3 of the unit has a downwardly extending wall 4 continuing slightly downwardly at 5 and then sloping upwardly at 6 to the level of the base 3. A barrier 7 extends across the filter to be opposite an intermediate area of the part 5 and is spaced therefrom. Thus liquid metal is constrained to flow horizontally at the position of the arrow A1; vertically downwards and then at an acute angle to the horizontal upwards at the position of the arrow A2 and horizontally again at A3. The chain line 8 indicates a porous substrate. This may comprise a plate or screen with apertures that do not contribute to the filtration. Alternatively the substrate may be a porous ceramic block such as a ceramic foam filter or a rigid media filter.

In advance of forming a filter on the substrate, particulate material, for example tabular alumina, in the size range 300 to 1700 microns is prepared (in a manner not shown) to enhance its wettability in liquid aluminium. This may involve surface coating the particles with a substance such as silver, copper, nickel, titanium, titanium diboride or other intermetallic inherently wetted by the liquid metal. Alternatively the coating may be of a substance such as a fluoride containing flux that also wets the particles. Preferably however the particles are pre-mixed with an aluminium alloy readily miscible with the alloy to be filtered and added thereto as a metal matrix composite body either as a semi-solid slurry or as a cast product thereof.

Figure 1:
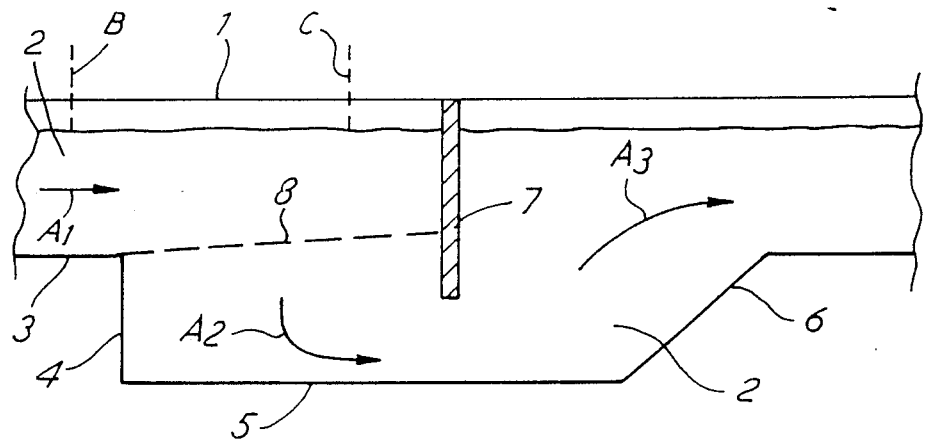
FIG. 1 is a diagrammatic side view of a filter unit.
Figure 2:
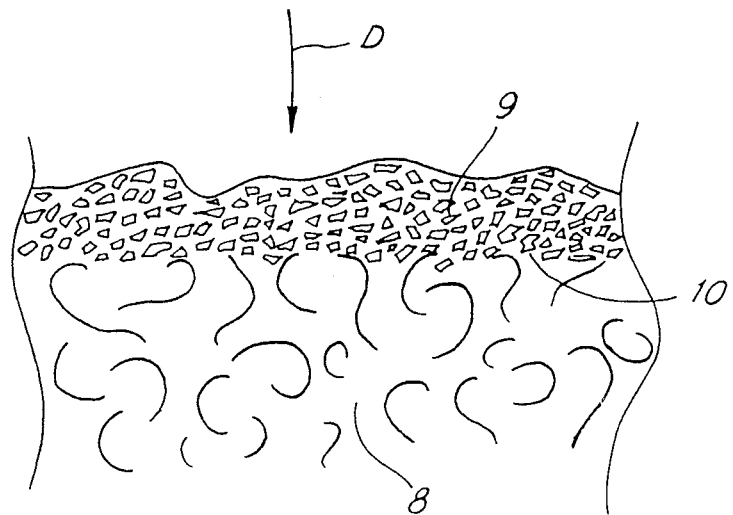
FIG. 2 is a large scale view of the interface between a substrate and a filter cake.

The treated particles (which are denser than liquid aluminium) are introduced to the launder 1 between points such as B and C. These particles, whether introduced as individual coated particles or as a metal matrix composite body in the form of a semi-solid slurry or as a cast product thereof, are dispersed and carried by the combined influence of liquid metal flow in the launder 1 and gravitational forces and are deposited at 9 (FIG. 2) on to the substrate 8. They are deposited in a fairly even manner and form a sharp interface with the substrate 8 as shown at 10. The deposited particles 9 remain discrete and are held against the substrate both by gravity and the continued flow of liquid metal as indicated by the arrow D.

It has been found advantageous for the deposition of particles on the substrate to be completed quickly. Firstly more successful bridging between the particles occurs when the frequency of their arrival at the surface of the substrate is high. Successful bridging reduces the opportunity for the particles to infiltrate the pores of the substrate and also a more porous filter cake is formed. Secondly we have found that the ability of the filter cake to retain inclusions from the liquid metal is reduced until the formation of the cake is completed.

The optimum rate at which particles are added to the liquid metal to form the filter cake is dependent upon the geometry of the filter unit; the flow rate of the liquid metal and the type of substrate used to support the cake. In the case where the particles are incorporated in a metal matrix composite body, either in the form of a semi-solid slurry or as a cast product thereof, the desired particle deposition rate is obtained by:

(a) previously controlling the volume fraction of particles within the metal matrix composite body
(b) by controlling, in the case of the cast product, its size and shape and
(c) by controlling the flow rate of the liquid metal to be filtered.

In order to achieve optimum results we have found it is usually desirable to maximise the volume fraction of particles contained in the semi-solid slurry and any subsequent cast product. This is achieved using a special mixing technique.

We have found that there are several important factors in the mixing process.

1. The temperature of the metal with which the particles are to be pre-mixed.
2. Control of the atmosphere above the mixing vessel.
3. The volume fraction of particles which are maintained in suspension within the mixing zone at any one time and,
4. the mixing action itself.

Generally, it is preferable that only the upper part of the liquid metal in the mixing vessel is stirred so that particles added thereto fall through the mixing zone after the desired "hold-up" time to form a fully "wetted" slurry.

It is preferable to use a "folding in" technique rather than stirring systems which generate large scale vortices within the vessel. This obviates the tendency for particles to agglomerate into clusters which are both difficult to re-disperse and may tend to float or sink prematurely and fail to become fully wetted. It is also generally desirable to have an inert or other controlled atmosphere above the melt surface when there is a tendency for either the particles or the molten metal to react with furnace gases.

PREPARATION OF CAST PRODUCT

Eighteen briquettes were formed from an aluminium alloy and tabular alumina particles by the following procedure:

Approximately 25 kg of tabular alumina in the size range 600–1100 microns was sieved, then washed to remove dust, then dried. Alumina was added, at a rate of approximately 2 kg/min, to a crucible containing 50 kg of molten aluminium alloy. The alloy incorporated approximately 1.3 wt % magnesium and was initially at about 800° C. During the addition of alumina, rapid immersion and wetting of the alumina by the molten alloy was enabled by mechanised stirring of the alloy using a folding action. This formed a slurry which was transferred by ladle and cast into notch bars on a vibrating casting table, where the slurry solidified. Eighteen briquettes were produced, each weighing approximately 2 kg. Samples of the aluminium alloy were taken from the crucible after addition of the alumina was completed. One sample was analysed by the process of optical emission spectroscopy.

The results of the analysis are listed below in weight percentages:

| Silicon | Iron | Copper | Manganese | Magnesium |
|---------|------|--------|-----------|-----------|
| 0.09%   | 0.39 | 0.001  | 0.006     | 1.09      |
| Chromium | Zinc | Titanium | | |
| 0.001   | 0.015 | 0.001 | | |

One of the briquettes was sectioned and polished and examined by image analysis and to estimate the alumina fraction of the briquette. The alumina fraction was measured to be 62 volume %, which corresponds to about 71 wt %.

Briquettes containing less than this volume % of alumina could be prepared by stirring the entire mixing vessel after an appropriate quantity of slurry has been formed, causing the temperature of the resultant mixture to fall to such a temperature that the liquid metal begins to solidify, and then casting the 3 phase product according to the above example. This results in particles (e.g. of alumina) being interspersed with dendrites of solid aluminium alloy.

Figure 3:
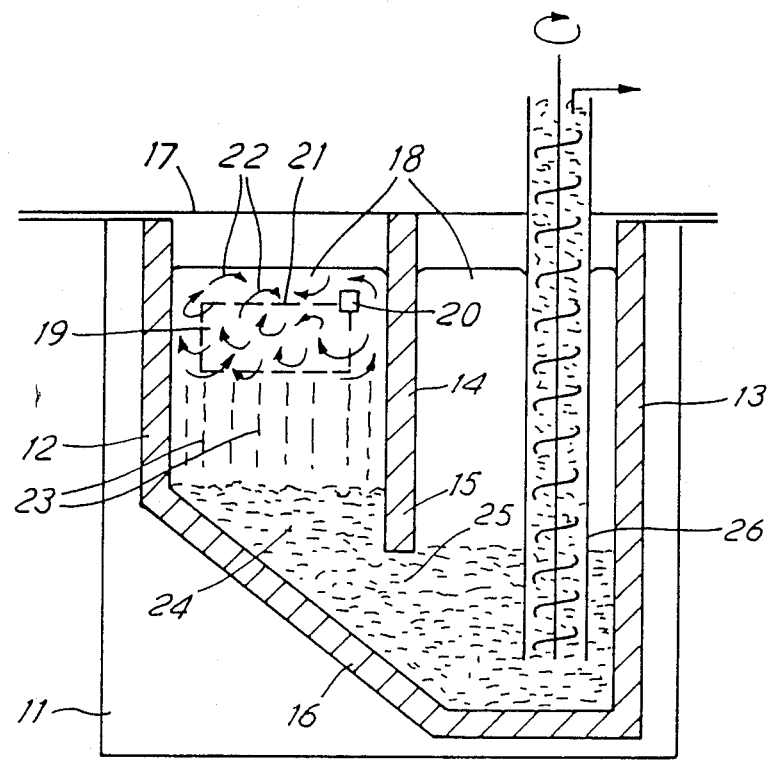
FIG. 3 is a side view of a furnace used for making a metal matrix composite.

FIG. 3 of the drawings shows a mixing furnace 11 having first and second parts 12 and 13 separated by a wall 14 the lower end 15 of which is spaced from a base 16 which slopes downwardly from the part 12 to the part 13. the furnace has a lid 17 and a liquid aluminium alloy 18 is held therein at a temperature of 800° C. to 900° C. A first (upper) region 19 of the part 12 is provided with a stirrer 20 that is constrained to follow a generally rectangular path around a horizontal axis as indicated by chain lines 21 to effect a "folding" action of the liquid metal. Particles 22 of tabular alumina in the size range 300 to 1700 microns (which are relatively more dense than the liquid metal) are introduced through an aperture (not shown) in the lid 17 to fall into the region 19 where they are repeatedly "folded" into the liquid metal alloy by the action of the stirrer 20. This stirring action holds the particles in separated suspension for a time longer than they would take to fall through the region 19 in the absence of stirring. Eventually the particles leave the region 19 and freely fall through substantially undisturbed liquid metal at 23 towards a second (lower) region 24 of the furnace where they form a slurry 25 that slides down the base 16 into the part 13 of the furnace. Here an archimedian screw conveyor 26 lifts the slurry out of the furnace where it can be cast into an appropriate product. Preferably it is squeeze cast into stick shapes or into saddle shaped granules or similar forms.

The free fall of the particles to the region 24 enables a high volume fraction of particles to build up in the slurry as has been described above. As we have also described above the slurry could be mixed with the liquid metal above it to produce a product having a lower volume fraction of particles that can be useful in a subsequent filtering process as will subsequently be described.

Examples will now be given of various control casts of liquid metal and casts filtered in accordance with the present invention.

Although, as described above, it has been assumed that the particles have a relative density greater than that of the liquid metal, this is not necessarily the case. If the particles have a lower relative density the first region 19 could be at the lower part of the furnace with the second region 24 above it. In this case the particles would be introduced to the lower part of the furnace where they would be "folded" into the liquid metal. They would then rise to the upper part of the furnace to form a slurry which could be skimmed off.

EXAMPLE 1

A series of extrusion billets 3.2 meters by 240 mm diameter were cast with a composition within the AA3004 specification. In all cases the liquid metal was filtered through a 6 inch square 30 ppi ceramic foam filter. The casts are summarised in Table I.

FILT 1 and FILT 8 are control casts using a ceramic foam filter in the normal mode of operation. In-line measurements of metal cleanliness before and after the filtering were made using the Alcan patented LiMCA technique (referred to later). From this data efficiency values for the removal of inclusions above 20 micron are 54.8% and −13.4% respectively. The second, negative, efficiency relates to the release of agglomerated inclusions by the ceramic foam filter from time to time.

Cast Nos. FILT A2 to FILT A7 refer to ingots cast according to different embodiments of the present invention. It is clear that for this material the addition of 700–1400 micron particulate added to the filter either directly by rabbling, (FILT A2) or via a liquid suspension (FILT A3) results in no improvement of efficiency, whereas the addition of 300–700 microns particulate either in liquid suspension (FILT 4 FILT 5 FILT 6) or in the form of prefabricated tablets (FILT 7), results in efficiencies above 95.5%.

TABLE 1

| Cast Number | Filtration Details | LiMCA DETAILS | | | | Filter Efficiency (Percent) Based On N20 |
|---|---|---|---|---|---|---|
| | | BEFORE FILTER | | AFTER FILTER | | |
| | | Measuring Periods (mins after start) | Overall Average N20 | Measuring Periods (mins after start) | Overall Average N20 | |
| FILT 1 | CFF. alone | 5–23 | 21.65 | 24–78 | 9.78 | 54.8 |
| FILT A2 | CFF. 700–1400 microns filter material rabbled | — | — | 2–75 | 5.4 | — |
| FILT A3 | CFF. 700–1400 microns filter material added as suspension | 49–80 | 36.09 | 1–40 | 25.93 | 28.2 |
| FILT A4 | CFF. 300–700 microns filter material added as suspension | 41–55 | 48.31 | 1–34 and 63–80 | 2.08 | 95.7 |
| FILT A5 | CFF. 300–700 microns filter material added as suspension in two batches | 26–35 | 25.06 | 1–17 and 43–78 | 0.89 | 96.4 |
| FILT A6 | CFF. 300–700 microns filter material added as suspension (reduced level) | 41–58 | 15.02 | 3–28 and 64–80 | 0.49 | 96.7 |
| FILT A7 | CFF. 300–700 microns filter material added as tablet (reduced level) | 31–46 | 21.99 | 2–25 and 52–80 | 0.91 | 95.8 |
| FILT A8 | CFF. alone | 10.45 | 6.79 | 2–46 | 7.70 | −13.4 |

EXAMPLE 2

Measurements have been made pre and post ceramic foam filtration on four 7150 alloy casts.

The addition of filter material to cast FILT A11 was more acceptable and the results shown in Table 9 indicate the improvement. There did seem to be a rather longer than usual transition period before the addition was fully active. The values from 9 to 77 mins include those readings obtained in the transition period, whilst the 23 to 77 minute values ignore this transition period. Overall efficiencies were 98 to 99.2 percent respectively for these two sets of readings. The uses of 700–1400 micron filter material in cast FILT A12 resulted again in excellent performance as shown in Table 10. An overall efficiency of 99.0 percent was reached compared with 59 percent before filter material addition (based on only 3 post-filter readings). Again, there was a transition time of a few minutes after particles were added as briquettes before a uniformly low level was reached. A measurement six minutes after the addition seemed to have reached steady-state conditions.

The use of the coarser briquettes resulted in a lower metal head with no deterioration in efficiency.

HEAD FILT A11 = 7 cm rising at end
HEAD FILT A12 = 1 cm-2 cm rising at end

EXAMPLE 3

An extrusion billet 3.0 meters by 400 mm diameter was cast with a composition within the AA7150 specification. The metal was filtered according to an embodiment of the present invention. The filter unit contained a 150 mm square 30 ppi ceramic foam filter substrate and a 0.75 kg briquette of aluminium alloy containing about 70 wt % alumina particles in the size range 300–600 microns was melted by immersing it in the liquid alloy flowing through the filter at a rate of 15 kg/min and temperature of 705° C. The briquette was immersed 2 minutes after the start of casting and melting of the briquette was completed 4 minutes after the start of casting. LiMCA measurements were made upstream and downstream of the filter and the results are shown in the graph of FIG. 11. This graph shows the N20 readings measured by LiMCA at various times during the cast. The average N20 levels before and after the filter were 26.6K and 0.33K respectively, the latter being calculated from readings taken 11 to 52 minutes after the start of the cast.

Although as described in the above examples filter material has been deposited upon a ceramic foam filter substrate it has been found that the present invention may also be used with advantage when the substrate is an rigid media filter. A significant reduction in the blinding of the rigid media filter was experienced.

It has further been found that in addition to the build up of the filter on the substrate at the beginning of the cast it may be desirable to continue to feed the filter material to the melt during the casting operation. It is for this purpose that rods of cast metal matrix composite having less than the maximum volume fraction may be used.

There may also be circumstances where untreated particles may be added to the liquid metal.

Figure 4:
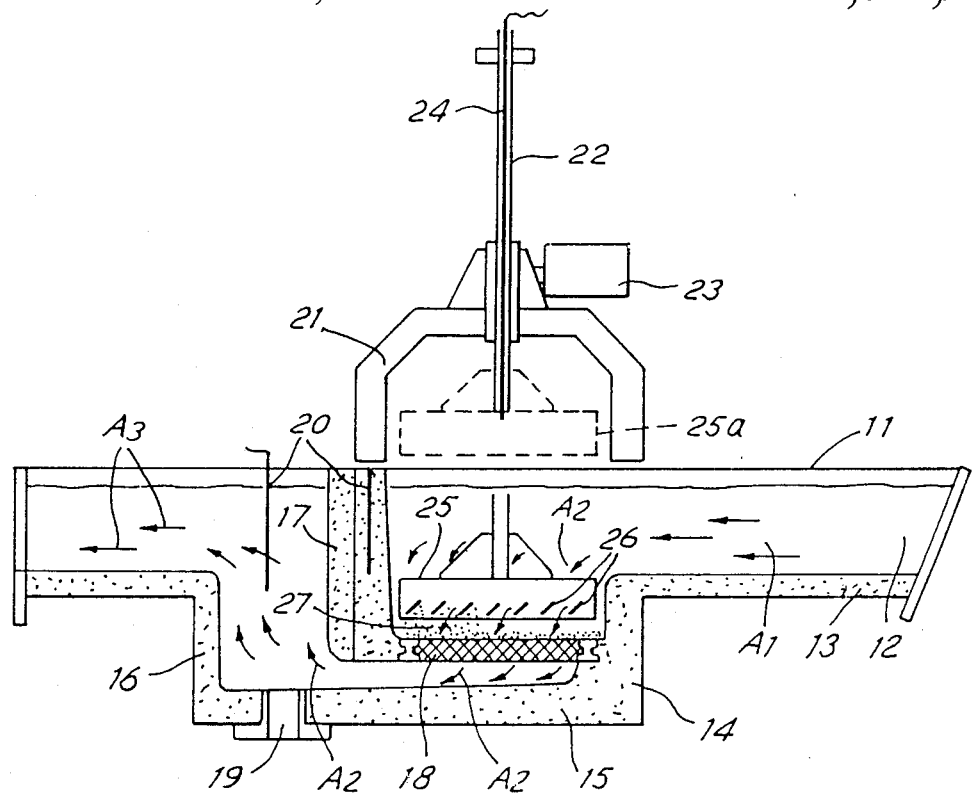
FIG. 4 is a view, similar to FIG. 1 of another filter unit.

FIG. 4 of the drawings shows an operational filter 11, carrying liquid aluminium, or aluminium alloy 12 in the directions of the arrows A1 to A3. The base 13 has a downwardly extending wall 14 to a lower base 15. An upwardly extending wall 16 extends from the lower base 15 to the level of base 13. A barrier 17 extends across the filter, to be opposite the wall 14 and spaced therefrom. A porous substrate 18 extends horizontally between the wall 14 and the lower part of the barrier 17. Thus, the liquid metal is constrained to flow horizontally at the position of the arrow A1, vertically downwards through the porous substrate 18 as indicated by arrows A2, and then vertically upwards and horizontally again as indicated by arrows A3.

A drain plug 19 is located in the base 15 and thermocouples 20 are provided in the barrier 17 and the outlet stream A3.

A hood 21 is mounted above the filter 11 in register with the substrate 18, and is horizontally moveable by rotating it around a vertical pivot (not shown) located at one edge of the hood. A vertical guide 22 is mounted in the centre of the hood 21. The guide 22 passes through the hood 21 and extends upwardly therefrom. The guide 22 is hollow and a shaft 24 is slidable therethrough, under the action of a motor 23. The shaft 24 carries a basket 25 at its lower end. The basket is moveable from a dotted line position 25a, above the filter 11, to a lowermost full line position just above the substrate 18. An access port (not shown) in the hood 21, provides access to the basket 25 when the basket is in its raised position 25a.

In operation the basket can be loaded with briquettes 26 via the access port in the hood while the basket is in its raised position. The briquettes may be in the form of "sticks", as notionally shown in FIG. 4, or they may be granules of, for example, "saddle shape" to provide large surface area for the granules to promote melting and an easy flow path for the liquid metal through the granules to promote priming.

The liquid metal is made to flow through the filter 11 and, as soon as all parts of the flow path are filled with flowing metal, the basket 25 is lowered to the position shown in FIG. 3, just above the substrate 18. The liquid metal flowing through the filter causes the solid metal portion of the briquettes 26 to melt. The inert particles 27 contained within the briquettes pass downwards under the action of gravity and metal flow, and settle on the substrate 18, where they form a filter cake. It has been found that all of the briquettes are completely melted within five minutes from the moment the briquettes are immersed in the liquid metal. Then the basket is retracted to its raised position. Thereafter, the liquid metal continues to flow through the filter cake of inert particles 27 for the rest of the duration of the filtering operation, which is typically 45 to 60 minutes.

When the filtering process is complete, the filter 11 is drained of liquid metal by removing the drain plug 19 and allowing the metal contained in the filter to flow into a pan (not shown) placed below the filter.

The arrangement above described assumes that the particles have a relative density greater than the liquid metal. If this is not the case the filter can operate with the cake deposited on the lower surface of the substrate. In this case, for example, the particles could be of Mullite.

Figure 5:
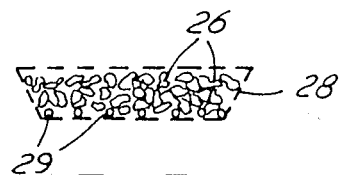
FIGS. 5 and 6 are diagrammatic views of a filter cartridge before and after the formation of a filter cake.
Figure 6:
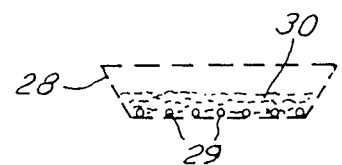

An alternative arrangement is envisaged in which briquettes in the form of granules are held in a porous, rigid container. FIG. 5 shows such a container 28 with a porous base 29, containing the briquettes 26. With this arrangement the hood 21, basket 25 and their associated mechanisms are not required and the substrate 18 can be omitted The container 28 is disposed in the position of the substrate 18 before liquid metal is made to flow through the filter 11. When liquid metal commences to flow, the granules are melted and the inert filter particles settle on the porous base 29 to form a filter cake, as shown in FIG. 6. When the casting process is complete the filter 11 is drained and the container 28, holding the filter cake 30, is removed. There is thus no filter cake debris left in the filter, and a fresh filter container 28 can readily be fitted for the next casting operation.

The facility provided by the containers of FIGS. 5 and 6 provides the opportunity to use more sophisticated, pre-prepared filter cartridges that can be stored indefinitely and used as required.

Figure 7:
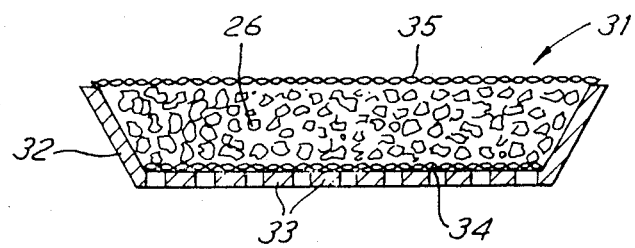
FIGS. 7 and 8 are views similar to FIGS. 5 and 6 of another arrangement.
Figure 8:
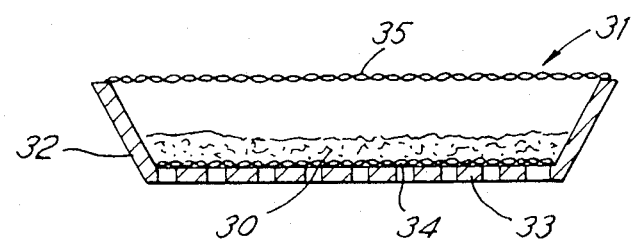

FIGS. 7 and 8 show cartridges 31 in the form of a ceramic dish 32 having a base formed as a ceramic grid 33. The base is covered by a woven glass cloth 34. The dish is filled with granules 26 and is covered by a woven glass cloth 35. FIG. 8 shows the dish after the filter cake 30 has been formed.

Figure 9:
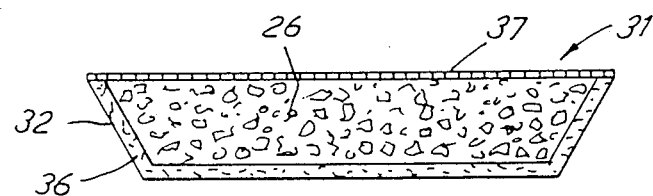
Figure 10:
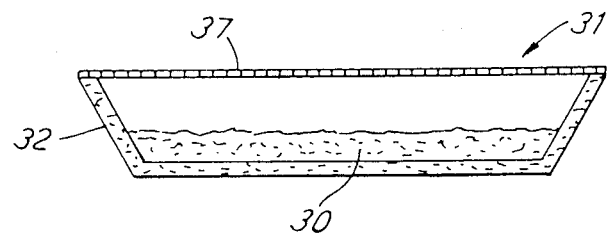

FIGS. 9 and 10 show another arrangement in which the dish 32 is wholly formed of ceramic foam filter material 36, and the woven glass cloth 35 is replaced by a perforated aluminium plate 37.

In this specification reference has been made to LiMCA. These initials stand for "Liquid Metal Cleanliness Analysis" and is a process designed to measure the concentration and size distribution of particles in liquid metal. The technique, based on the resistive pulse principle, makes measurements on-line which are displayed in real time. The technique has been patented by Alcan International Limited and examples of results presented at external meetings (R. I. L. Guthrie and D. A. Doutre; "On-line measurement of inclusions in liquid melts"; paper presented at the International Seminar on refining and alloying of liquid Aluminium and Ferro-alloys Aug. 26-28 1985; Trondheim, Norway.

The usual method of presentation of results is to quote the "N20 level" measured at various times throughout a cast. This value represents the number of particles in the metal, in thousands per kg, between 20 and 300 microns. The system allows the investigation of ranges of particle sizes within these limits, but does not identify the nature of these particles.

In this specification, when the phrase "particles stable within the liquid metal" is used, the word "stable" is to be taken as meaning either "inert" or sufficiently reactive to encourage wetting but sufficiently unreactive to persist within the liquid metal for the time required or in thermodynamic equilibrium with the liquid metal.

For example the particles may include alumina (as described above), zirconia, silicon carbide, refractory borides such as titanium diboride or intermetallic compounds such as zirconium aluminide.

The metal matrix composite described above for the production of briquettes for use in filtering liquid metal can have other uses. For example it can be used as high temperature gaskets in circumstances where resistance to compressive loads is desirable. Also it could be employed for thermal, electrical or acoustic damping. In both such cases it may not be desirable to have the highest attainable volume concentration.

Although we have described the present invention in connection with aluminium and its alloys it will be understood as being applicable to other metals and their alloys, in particular, ferrous and light metal alloys such as magnesium.

What we claim is:

1. A method of forming a filter cake for filtering liquid metal comprising the steps of:
   (a) disposing a liquid metal permeable substrate in a flow path of the liquid metal to be filtered and
   (b) disposing particles that are stable with respect to the liquid metal into said flow path, upstream of the substrate, so that said particles are carried at least partially, as well as wetted, by the metal flow and dispersed as a pre-wetted and pre-primed filter cake on the substrate.

2. A method according to claim 1 in which the substrate is first disposed in the flow path, the liquid metal is caused to flow therethrough and the particles are then deposited in the metal flow.

3. A method according to claim 1 in which the continuing flow of liquid metal through the particles is utilised to assist in the initial aggregation of the particles to form the cake on the substrate.

4. A method according to claim 1 in which the particles are treated to enhance their wettability before their deposition in the flowing liquid metal.

5. A method according to claim 4 in which the particles are treated by adding them to a suitable, second, liquid metal miscible with the liquid metal to be filtered; holding the second liquid metal within a predetermined temperature range for a particular time while being agitated so that when a resultant slurry of the second liquid metal and the particles is added to the liquid metal the particles freely disperse within the liquid metal and remain wetted thereby.

6. A method according to claim 5 in which the slurry containing the particles is cast and the cast product added to the liquid metal.

7. A method according to claim 4 in which the particles are coated with a substance wettable by the liquid metal and added directly thereto.

8. A method according to claim 7 in which the substance is selected from silver, copper, nickel, titanium and titanium diboride or other intermetallics inherently wetted by the liquid metal.

9. A method according to claim 7 in which the substance is a fluoride containing flux.

10. A method according to claim 1 in which the substrate is in the form of a plate and is formed with apertures of such a size that it does not contribute substantially to the filtration of the liquid metal.

11. A method according to claim 1 in which the particles have a density greater than the liquid metal and are deposited therein so that they are distributed substantially evenly over the surface of the substrate partly under gravity and partly by metal flow.

12. A method according to claim 11 in which the particles are deposited in a generally vertical flow so that their distribution over the surface occurs substantially wholly under gravity.

13. A method according to claim 1 in which the particles have a relative density less than the liquid metal, the substrate is disposed horizontally and the particles are deposited on the under surface thereof wholly by sedimentation as the liquid metal flows upwardly therethrough.

14. A method according to claim 6 and in which the cast products are contained in a cartridge having opposed liquid metal permeable upper and lower faces, the lower face constituting a substrate which is located in the flow path of the liquid metal and removed after use.

15. A method of filtering liquid metal using a filter formed according to claim 1.

16. A method according to claim 1 in which further particles are added upstream of the substrate during filtering of the liquid metal.

17. A process for producing a metal matrix composite from a light metal alloy containing particles stable with respect to the alloy in its liquid state comprising the steps of:
   a. holding a body of liquid metal alloy in a furnace;

b. stirring only a first region of the alloy so that a second region of the alloy remains substantially undisturbed;

c. adding the particles to the first region at such a rate that continuing the stirring operation permits the particles to move through the first region to form a slurry in the second region.

18. A process according to claim 17 in which the first and second regions are respectively upper and lower regions and the particles have a greater relative density than the alloy.

19. A process according to claim 17 in which the particles move from the first to the second region at approximately the same rate as they are added to the first region.

20. A process according to claim 18 in which the stirring operation holds the particles in the upper region for a time longer than they would take to fall through this region without stirring.

21. A process according to claim 20 in which the particles eventually fall in a substantially free manner to the lower region.

22. A process according to claim 17 in which the stirring produces a "folding" movement in the alloy of the first region.

23. A process according to claim 22 in which the stirrer follows a path about a horizontal axis.

24. A metal matrix composite body cast from the slurry produced by the process of claim 17.

25. A body according to claim 24 cast into granules or sticks.

26. A filter cartridge comprising a perforate container filled with granules or sticks according to claim 25.

27. A filter cartridge comprising a container of flexible perforate material have a rigid grid disposed therein and filled with granules or sticks according to claim 25.

28. The method of claim 1, wherein said particles have a size range of about 300–1700 microns.

29. The method of claim 28, wherein said particles are alumina particles.

* * * * *